US010970607B2

(12) United States Patent
Xue et al.

(10) Patent No.: US 10,970,607 B2
(45) Date of Patent: Apr. 6, 2021

(54) SECURE QR CODE USING NONLINEARITY OF SPATIAL FREQUENCY IN LIGHT

(71) Applicant: Shanghai Jiao Tong University, Shanghai (CN)

(72) Inventors: Guangtao Xue, Shanghai (CN); Yichao Chen, Shanghai (CN); Hao Pan, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 16/570,529

(22) Filed: Sep. 13, 2019

(65) Prior Publication Data

US 2020/0184293 A1     Jun. 11, 2020

(30) Foreign Application Priority Data

Dec. 7, 2018   (CN) .......................... 201811494507.1

(51) Int. Cl.
*G06K 9/80*     (2006.01)
*G06K 19/06*    (2006.01)
*G06K 7/14*     (2006.01)

(52) U.S. Cl.
CPC ....... *G06K 19/0614* (2013.01); *G06K 7/1478* (2013.01); *G06K 7/1491* (2013.01); *G06K 19/06037* (2013.01)

(58) Field of Classification Search
CPC ... G06K 19/06; G06Q 20/1235; G06Q 20/202
USPC ................................. 235/494, 462.09, 462.1
See application file for complete search history.

(56) References Cited

U.S. PATENT DOCUMENTS

| 7,702,162 | B2* | 4/2010 | Cheong | G06K 7/1408 382/232 |
| 8,625,167 | B2* | 1/2014 | Amagai | G06T 3/00 358/3.28 |
| 8,881,990 | B2* | 11/2014 | Hunt | G09F 3/005 235/494 |
| 2010/0321739 | A1* | 12/2010 | Amagai | G06T 3/00 358/3.28 |
| 2011/0002012 | A1* | 1/2011 | Amagai | H04N 1/00883 358/3.28 |

(Continued)

*Primary Examiner* — Daniel St Cyr
(74) *Attorney, Agent, or Firm* — Hamre, Schumann, Mueller & Larson, P.C.

(57) ABSTRACT

This invention relates to a secure QrCode communication method based on nonlinear spatial frequency characteristics, comprising: camera modeling: modeling according to the spatial frequency of the color filter matrix of the scanning device's camera; QrCode encryption: using the CFA spatial frequency of scanning device and modeling results, as well as the spatial frequency of the display device, generate an encrypted picture of the target QrCode on the display device; QrCode decryption: the camera of the scanning device takes the picture of the display at a specified position and a specified angle, and parses the image to recover the target QrCode. Compared with the prior art, the present invention utilizes the nonlinear characteristics of the optical spatial frequency, and uses the spatial frequency of the camera's own color filter array and the spatial frequency of the display to modulate the target two-dimensional code through phase to achieve the effect of encryption.

8 Claims, 4 Drawing Sheets

(a) mQR code taken by camera   (b) Enhance saturation   (c) Segment into blocks   (d) Convert into black and white (e) Label adjacent blocks with the same color   (f) Combine multiple frames   (g) Color blocks with black and white

(56) References Cited

U.S. PATENT DOCUMENTS

2015/0295711 A1* 10/2015 Javidi .................. G09C 5/00
  713/193
2015/0302421 A1* 10/2015 Caton ................. G06F 21/36
  705/17

* cited by examiner (a) $f = 1$.  (b) $f = \frac{1}{2}$.  (c) $f = \frac{1}{3}$.  (d) $f = \frac{1}{4}$.

(a) mQR code taken by camera  (b) Enhance saturation  (c) Segment into blocks  (d) Convert into black and white (e) Label adjacent blocks with the same color  (f) Combine multiple frames  (g) Color blocks with black and white

SECURE QR CODE USING NONLINEARITY OF SPATIAL FREQUENCY IN LIGHT

BACKGROUND OF THE INVENTION

Technical Field

The invention relates to the security of near field communication, in particular to a secure QrCode communication method based on nonlinear spatial frequency characteristics.

Description of Related Art

Quick response codes (QrCodes) are becoming an integral part of everyday life because of its fast readability and the popularity of the built-in camera on the mobile phones, making QrCodes ubiquitous in our daily lives. As a convenient mobile payment method in China and surrounding areas, QrCode is becoming more and more important for the retail industry. One of the security risks currently existing with QrCodes is replay attacks and Synchronized Token Boost and Expenditure (STLS) attacks. The attacker makes a mobile payment or accesses the victim's private information by taking the victim's QR code and using the copied QR code. Because there are many retailers (such as Wal-Mart, Starbucks), financial organizations (such as Taobao, Alibaba) social networking applications (such as WeChat, Tencent QQ) will generally support two-dimensional mobile fast payment, such an attack may cause huge economic losses, or private information leaked. Encrypting QrCode is the most common solution to dealing with these attacks. However, recent research shows that traditional encryption technology does not mitigate the threat of attackers, because the current encryption is usually at the coding level, while the conventional QrCode has a maximum capacity of only 1000 bytes. This will result in loss of information capacity, so the strength of encryption is not high.

BRIEF SUMMARY OF THE INVENTION

The object of the present invention is to provide a secure QrCode communication method based on nonlinear spatial frequency characteristics in order to overcome the drawbacks of the prior art described above.

The object of the present invention can be achieved by the following technical solutions:

A secure QrCode communication method based on nonlinear spatial frequency characteristics, comprising:

Camera modeling: modeling based on the spatial frequency of the camera color filter matrix of the scanning device;

QrCode encryption: using the CFA spatial frequency of the scanning device's camera and the modeling result, and the spatial frequency of the display device, generating an encrypted picture of the target two-dimensional code on the display device;

QrCode decryption: The camera of the scanning device captures the encrypted two-dimensional code in the display at a specified position and a specified angle, analyzes the target two-dimensional code and recovers it.

The modeling process specifically models the color filter matrix of the green filter layer. The modeling result is:

$$m_{cfa}(x,y)=p_{cfa}(\phi_{cfa}(x,y))$$

$$p_{cfa}(u)=0.5+0.5\cos(2\pi u)$$

$$\phi_{cfa}(x,y)=((x,y) \bmod 2)/2$$

Where $m_{cfa}(x,y)$ is the receiving information of the green filter layer on the camera image sensor at coordinates (x,y), $p_{cfa}(\bullet)$ is the periodic function of the green filter layer in the CFA, and $\phi_{cfa}(x,y)$ is the phase function of the green filter layer in the CFA.

The QrCode encryption process specifically includes:

Step A1: performing phase and frequency modulation on the original two-dimensional code image picture by using the CFA spatial frequency of the scanning device's camera and the modeling result, and the spatial frequency of the display device;

Step A2: adding Gaussian white noise to the modulated picture to blur the contour in the encrypted QrCode.

The two-dimensional code decryption process specifically includes: The QrCode decryption process specifically includes:

Step B1: acquiring a plurality of consecutive pictures captured by the camera in the specified position and the specified angle to encrypt the QrCode in the display;

Step B2: selecting an unprocessed image and converting the RGB image to the HSV coordinates to maximize the saturation dimension;

Step B3: according to the positions of the three positioning marks, determining the size of the QrCode and dividing the QrCode for the converted picture to obtain a plurality of blocks;

Step B4: extracting a green square, for each pixel point, when the green intensity is greater than a predetermined threshold, it is judged to be white, and vice versa, it is judged to be black;

Step B5: for each square, determine the color of the square according to the distribution of white and black pixel points in the square;

Step B6: traversing all the black squares and mark all adjacent black squares to the same index value;

Step B7: determining whether all the blocks are marked or unmarked squares are all surrounded by the marked blocks, if yes, proceed to step B8, otherwise, return to step B2;

Step B8: coloring according to the index value of each block, if two adjacent squares have the same index value, they are colored into the same color, and vice versa.

The step B6 specifically includes: Step B61: traversing all the black squares, and determining an index value of each block under the frame based on the principle that all adjacent black squares mark the same index value;

Step B62: determining whether the index value exists in each block, and if not, the index value of the block in the current frame is used as the index value of the block, otherwise, step B63 is performed.

Step B63: determining whether the index value of the block in the current frame is consistent with the previous index value. If not, all the blocks marked with the index value of the block in the previous frame are marked with the index value of the block under the frame.

The step B8 specifically includes: Step B81: coloring the squares in the three positioning mark areas; Step B82, based on the coloring result of the squares in the three positioning areas, coloring according to the index values of the blocks, if the two adjacent squares have the same index value, the colors are colored the same color, and vice versa.

The designated position is between 20 and 45 cm from the display.

The designated position is 30 cm from the display.

The specified angle is perpendicular to the angle of the plane of the display.

Compared with the prior art, the present invention has the following beneficial effects:

1) The present invention utilizes the nonlinear characteristics of the optical spatial frequency, and uses the spatial frequency of the camera's own color filter array and the spatial frequency of the display to modulate the target two-dimensional code through phase to achieve the encryption effect.

2) The present invention satisfies the security and performance indicators, and does not require modification of existing hardware settings, and can directly upgrade the existing QrCode communication system from the software to increase communication security.

3) Encrypting the target QrCode by using the moiré generated by the optical nonlinear spatial frequency, and capturing and decrypting the encrypted QrCode at a specified position and angle through the camera in the smartphone, the effect of encryption and decryption is good from the optical level.

4) Since the electronic screen displaying the two-dimensional code itself has spatial frequency characteristics, the need for special optical hardware is eliminated, and frequency modulation of various shooting distances is provided.

5) Systematic analysis of the spatial frequency characteristics of the screen and camera, the two-dimensional code encryption communication is realized on the common electronic display and smart phone on the market.

6) Clever use of the known colors of the three positioning areas allows for fast coloring.

7) The Gaussian white noise is added to blur the contour of the target two-dimensional code, thereby utilizing the distortion generated by the camera when the angle and distance are not suitable, and further encryption is realized.

BRIEF DESCRIPTION OF THE SEVERAL VIEWS OF THE DRAWINGS

FIG. 4 (*b*) is a schematic diagram of an encryption effect based on a green filter layer;

FIG. 4(*c*) is a schematic diagram of an encryption effect based on a red filter layer;

FIG. 4(*d*) is a schematic diagram of an encryption effect based on a blue filter layer;

FIG. 7(*b*) is a schematic diagram of the shooting angle and decoding rate in the experimental results of secure QrCode communication based on nonlinear spatial frequency characteristics.

DETAILED DESCRIPTION OF THE INVENTION

Figure 1:
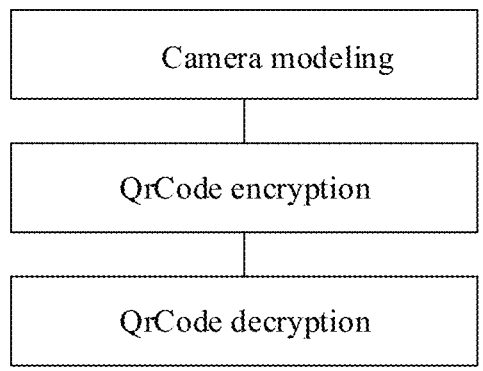
FIG. 1 is a schematic flow chart of main steps of the method of the present invention.
Figure 2:
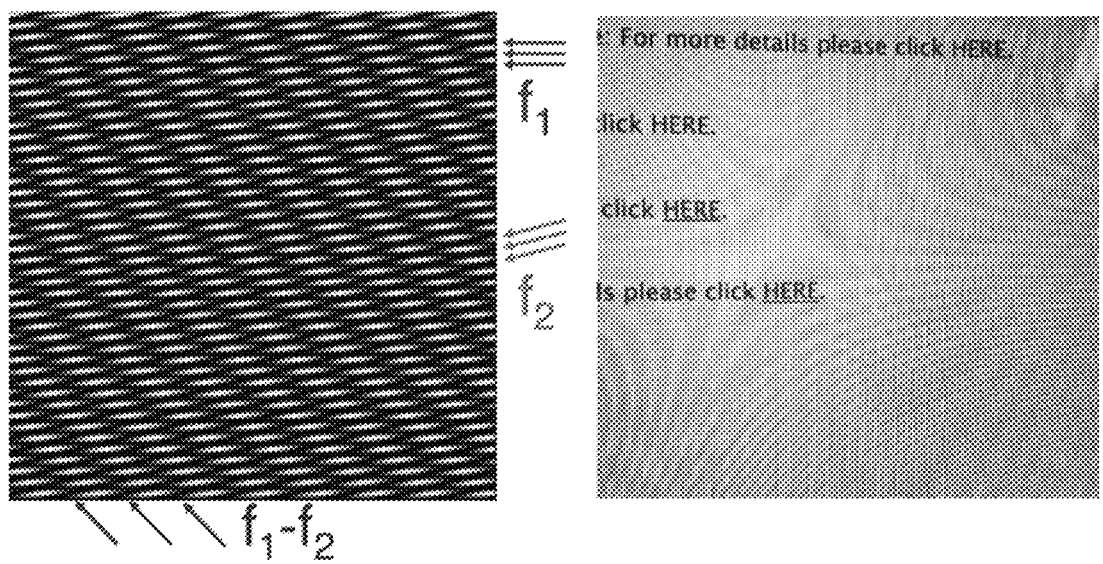
FIG. 2 is a nonlinear phenomenon generated by superposition of two spatial frequencies in optical and a schematic diagram of a moiré generated by a camera-capture display.

The invention will be described in detail below with reference to the drawings and specific embodiments. This embodiment is implemented on the premise of the technical solution of the present invention, and detailed implementation manners and specific operation procedures are given, but the scope of protection of the present invention is not limited to the following embodiments. To solve the security problem, we propose mQRCode, which encrypts and decrypts the QR code using nonlinear features of optically specific spatial frequencies. When the target receiver holds the camera at the specified position (for example, 30 cm and 0°), the encrypted QR code will be revealed as the original QrCode due to the mole phenomenon. A malicious attacker will only see the encrypted camouflage QrCode anywhere else. Our experiments show that the decryption rate of mQRCode is 95% and the average decoding rate is above 0.82 seconds. When the camera is 10 cm or 15° away from the specified position, the decoding rate drops to zero. So it directly isolates the attacker's attack and is a secure means of communication. A secure QrCode communication method based on nonlinear spatial frequency characteristics, as shown in FIG. 1 to FIG. 6, includes two parts: encryption and decryption: 1) a color filter array spatial frequency and a display through a known camera spatial frequency, using phase modulation and frequency modulation to generate an encrypted QrCode pattern on the display; 2) taking a picture of the encrypted pattern with a camera at a specified position and angle from the display, and finally parsing the original QrCode pattern by using a decryption algorithm and recovering to get relevant information. By carefully performing the phase and frequency modulation of the encrypted two-dimensional code, the attacker cannot use the camera to obtain the target QrCode pattern at any position other than the specified position, thus ensuring that the QrCode communication is visually eliminating the information leaked. Optically, when two patterns with regular spatial frequencies are superimposed, an additional spatial frequency pattern called moiré is created, as shown in FIG. 2. Assume that the spatial frequencies of the two superimposed patterns are $f_1$ and $f_2$, respectively. Through the multiplication model, the superimposed pattern will appear with two additional spatial frequencies: $(f_1+f_2)$ and $(f_1-f_2)$, but The eye is more sensitive to the low frequency pattern, so the picture on the left side of FIG. 2 is the pattern of $(f_1-f_2)$ frequency. The camera is also a nonlinear optical system, because the color filter matrix in the camera sensor has a moiré pattern when photographing some specific regular spatial frequency patterns, as shown in the right figure of FIG. 2.

Figure 3:
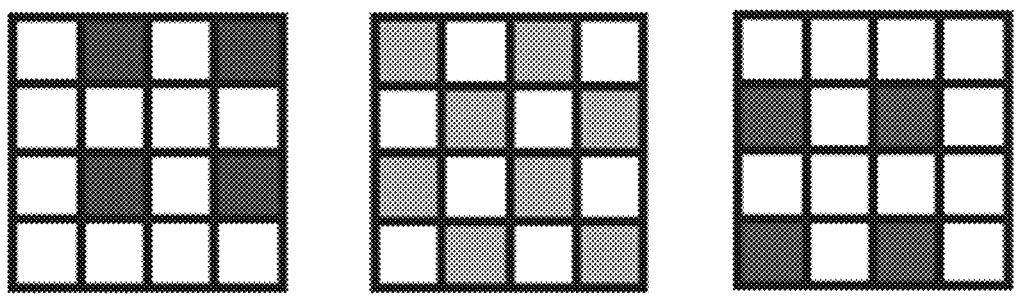
FIG. 3 is a schematic diagram of a Bayer color filter matrix in a camera.

In the encryption process, more specific, because the camera's color filter array (FIG. 3) contains spatial frequency features of three colors, different color filter array types will have different distribution of colors. The color filter matrix of Bayer distribution in FIG. 3 is the most common color filter matrix in current mobile smartphone cameras, consisting of three different spatial patterns of red, green and blue. When the camera is used to capture the display, the pixel on the display is projected onto the camera sensor to form a spatial pattern of the first layer of spatial frequency $f_1$, and the CFA of the camera sensor itself forms a spatial pattern of the second layer with a spatial frequency of $f_2$. When the camera is placed in the correct position and angle, the spatial frequency can be seen by $(f_1-f_2)$ due to the mole phenomenon, which results in a ripple pattern due to nonlinear optical interaction. Specifically, as shown in FIG. 1, it includes:

Camera Modeling: Modeling based on the spatial frequency of the camera's color filter matrix of the scanning device, where the camera color filter matrix parameters of the scanning device are known. The present application utilizes nonlinear optical interaction between the color filter matrix of the camera and the camouflage pattern to encrypt and decrypt the two-dimensional code. We assume that the spatial model of the color filter matrix is $m_{cfa}(x,y)$ and the original two-dimensional code is $m_{dec}(x,y)$. The encryption process is to calculate the encrypted two-dimensional code model $m_{enc}(x,y)$ to satisfy: $m_{sec}(x,y)=m_{cfa}(x,y)*m_{enc}(x,y)$. First, we need to model the color filter matrix, $m_{cfa}(x,y) = p_{cfa}(\phi_{cfa}(x,y))$. FIG. 3 shows the color sensor distribution of the Bayer color filter array. We choose the color of the green filter layer. The filter array is modeled. Because 1) the QrCode contains only two colors, and it has been experimentally proved that the use of the green filter layer can fully cope with the requirements of encryption and decryption; 2) The green filter layer is completely symmetrical in the 2D array, and the number is the most, the human eye is difficult to make a distinction when the phase changes, which is conducive to the encryption of the pattern. We model the spatial model of the green filter layer as follows:

$$m_{cfa}(x,y)=p_{cfa}(\phi_{cfa}(x,y))$$

$$p_{cfa}(u)=0.5+0.5\cos(2\pi u)$$

$$\phi_{cfa}(x,y)=((x,y)\bmod 2)/2$$

Where: $m_{cfa}(x,y)$ is the receiving information of the green filter layer on the camera image sensor at coordinates (x,y), $p_{cfa}(\cdot)$ is the periodic function of the green filter layer in the CFA, and $\phi_{cfa}(x,y)$ is in the CFA The phase function of the green filter layer. To calculate $m_{enc}(x,y)=p_{enc}(\phi_{enc}(x,y))$, we define $p_{enc}(u)=0.5+0.5\cos(2\pi u)$. We perform phase modulation by mapping black and white in the two-dimensional code to different phases. Since $m_{dec}(x,y)$ and $m_{cfa}(x,y)$ are known, combined with the Moore theory and the Fourier transform theory:

$$m_{dec}(x,y)=p_{dec}(\phi_{dec}(x,y))=p_{dec}(\phi_{cfa}(x,y)-\phi_{enc}(x,y))$$

$$\phi_{enc}(x,y)=\phi_{cfa}(x,y)-p_{dec}^{-1}(m_{dec}(x,y))+2k\pi, k\in Z$$

Figure 4:
FIG. 4 (*a*) is a schematic diagram of the original two-dimensional code.
Figure 4:
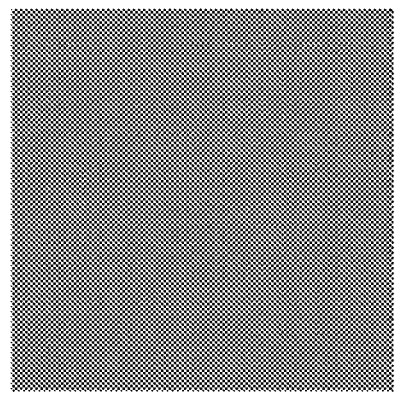
Figure 4C:
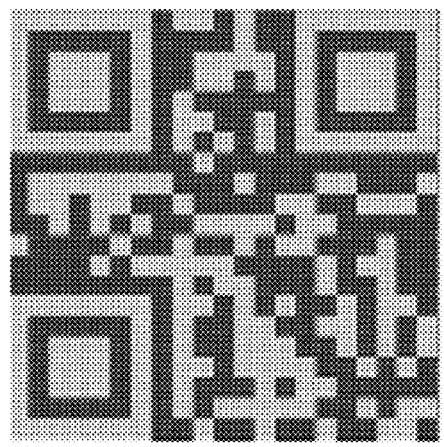
Figure 4D:
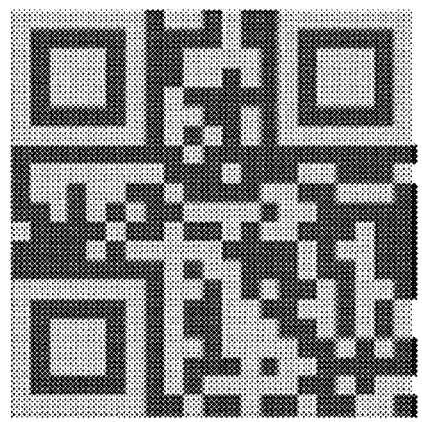

FIG. 4 shows the encryption effect after modeling with three filter layers of green, red and blue and phase modulation. It is found that the effect of using the green filter layer is the best.

QrCode encryption: using the CFA spatial frequency and modeling result of the scanning device, and the spatial frequency of the display device display, generating an encrypted image of the target two-dimensional code on the display device, specifically including:

Step A1: performing phase and frequency modulation on the original QrCode image picture by using the CFA spatial frequency of the scanning device and the modeling result, and the spatial frequency of the display device;

Step A2: Add Gaussian white noise to the modulated picture to blur the contour in the encrypted QrCode.

Figure 5:
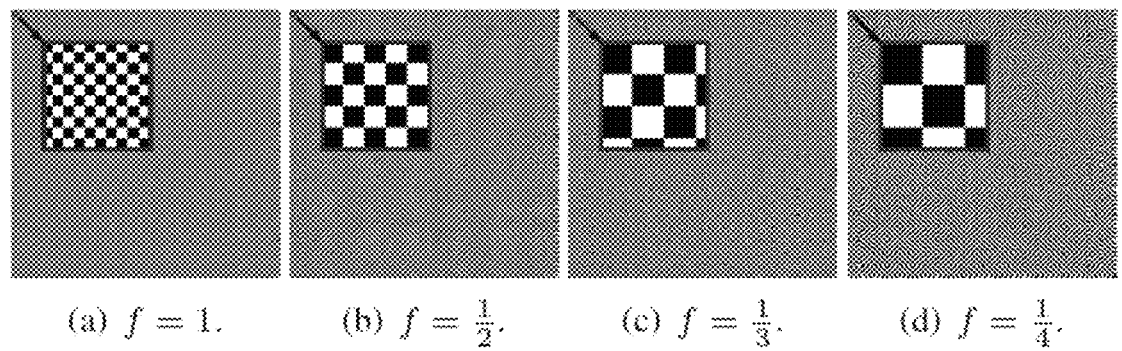
FIG. 5 is an encryption effect diagram based on display spatial frequency modulation.
Figure 6:
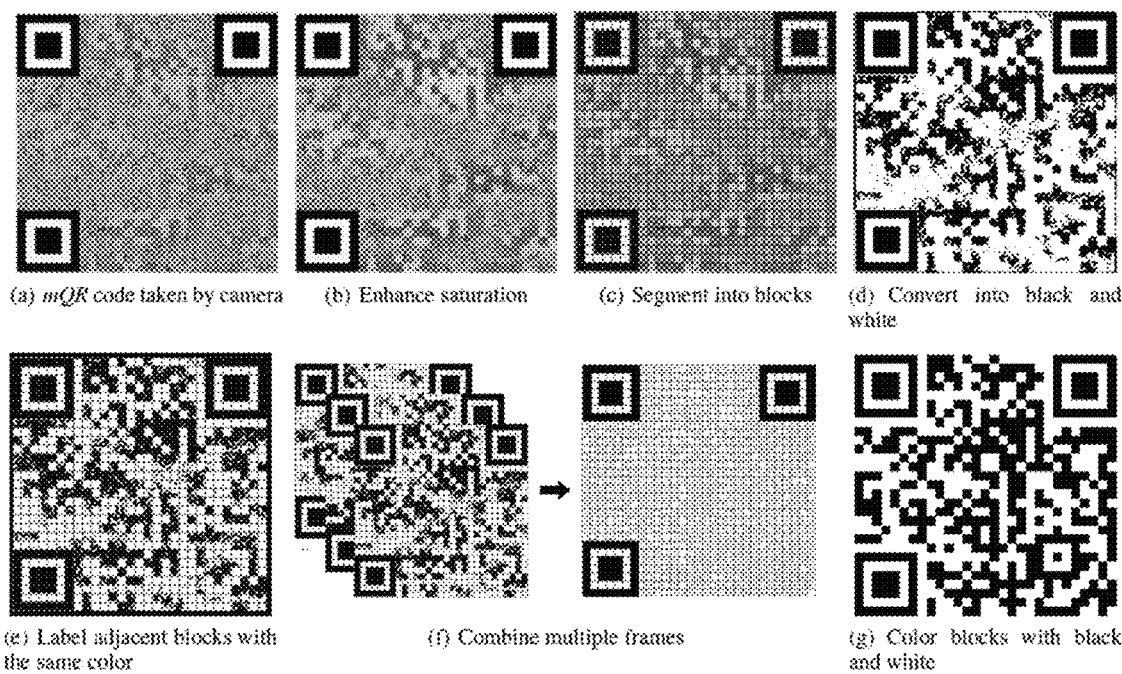
FIG. 6 is a decoding flowchart of a camera taking a photo.

The use scene of the daily QrCode requires the QrCode to have a plurality of communication distances. In order to support a plurality of communication distances, the present invention expands the green filter layer space model function by modulating the frequency to generate a new space model. FIG. 5 illustrates the effect of mQRCode re-encoding the image with frequency modulation to accommodate different communication distances in a variety of application scenarios. But when we adjust the spatial frequency down, the contour of the target QR code becomes more obvious and the encryption effect is worse as shown in FIG. 5(d). Therefore, the present invention also adds 10% of Gaussian white noise after phase and frequency modulation to blur the target QrCode profile.

QrCode decryption: The camera of the scanning device captures the encrypted QrCode in the display at a specified position and a specified angle, and restores the target QrCode and parses it, including:

Step B1: acquiring a plurality of consecutive pictures captured by the camera in the specified position and the specified angle to encrypt the QrCode in the display;

Step B2: selecting an unprocessed image and convert the RGB image to the HSV coordinates to maximize the saturation dimension. FIG. 6(a) is a picture taken by the camera. The converted picture is shown in FIG. 6(b).

Step B3: determining, according to the positions of the three positioning marks, the size of the QrCode and dividing the QrCode for the converted picture to obtain a plurality of blocks;

Among them, there are two versions of common QR codes (version1 is 21×21 squares and version2 is 177×177 squares). The QR code has three positioning marks and is fixed in position, so we can distinguish the saturated image and determine the width and height, then calculate the size of each square and divide it, as shown in FIG. 6(c).

Step B4: extracting a green square, for each pixel point, when the green intensity is greater than a predetermined threshold, it is judged to be white, and vice versa, it is judged to be black;

In order to reliably identify the squares with the same phase, we first separate the green squares from blue/red. For each pixel, when the green intensity is greater than the specified threshold, the pixel will be judged as white, otherwise it will be judged as black. The converted picture is shown in FIG. 6(d).

Step B5: For each square, determine the color of the square according to the distribution of white and black pixel points in the square; wherein the noise added during the blurring of the QrCode contour and the noise generated during the shooting process which made in each square includes both black and white pixels. To classify each block into black or white, we use a weighted block filter to filter each block. The weight block filter is the same size as each small block in the QR code. The filter has more weight at the center of the block and a smaller weight at the edge of the block. After each block and the weight block filter are multiplied, the resulting weights are sorted into black and white according to a predetermined threshold.

Step B6: traversing all the black squares. Since the adjacent squares are all black, the adjacent two squares have the same modulation phase value, so all the adjacent black squares are marked to the same index value. The detailed methods are included:

Step B61: traversing all the black squares, and determining an index value of each block under the frame based on the principle that all adjacent black squares mark the same index value;

Step B62: determining whether the index value exists in each block, and if not, the index value of the block in the current frame is used as the index value of the block, otherwise, step B63 is performed:

Step B63: determining whether the index value of the block in the current frame is consistent with the previous index value. If not, all the blocks marked with the index value of the block in the previous frame are marked with the index value of the block under the frame.

Step B7: determining whether all the blocks are marked or unmarked squares are all surrounded by the marked blocks, if yes, proceed to step B8, otherwise, return to step B2;

Step B8: coloring according to the index value of each block. If two adjacent blocks have the same index value, they are colored into the same color, and vice versa, and then colored into different colors, the detail methods are shown in the following:

Step B81: coloring the squares in the three positioning mark areas;

Step B82, coloring according to the index values of the blocks based on the coloring result of the squares in the three positioning areas, if the two adjacent squares have the same index value, the colors are colored the same color, and vice versa. color the inverted.

The designated position is between 20 and 45 cm from the display. Preferably, the designated position is 30 cm from the display. In addition, the specified angle is perpendicular to the angle of the display plane.

Figure 7A:
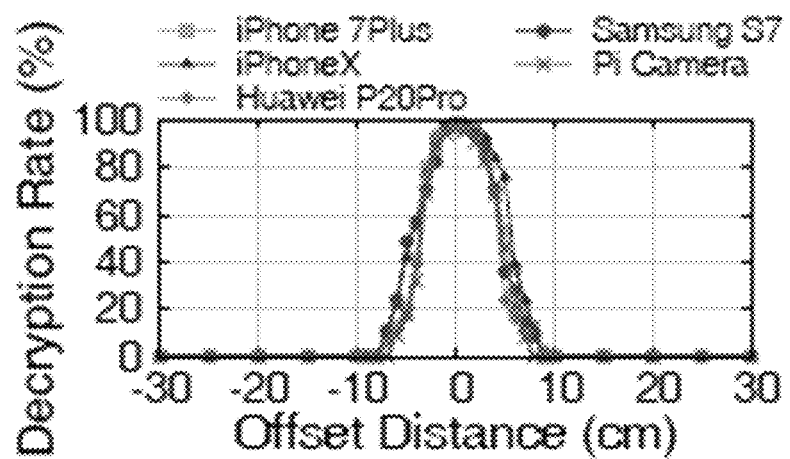
FIG. 7(*a*) is a schematic diagram of shooting distance and decoding rate in a safety two-dimensional code communication experiment result based on nonlinear spatial frequency characteristics.
Figure 7B:
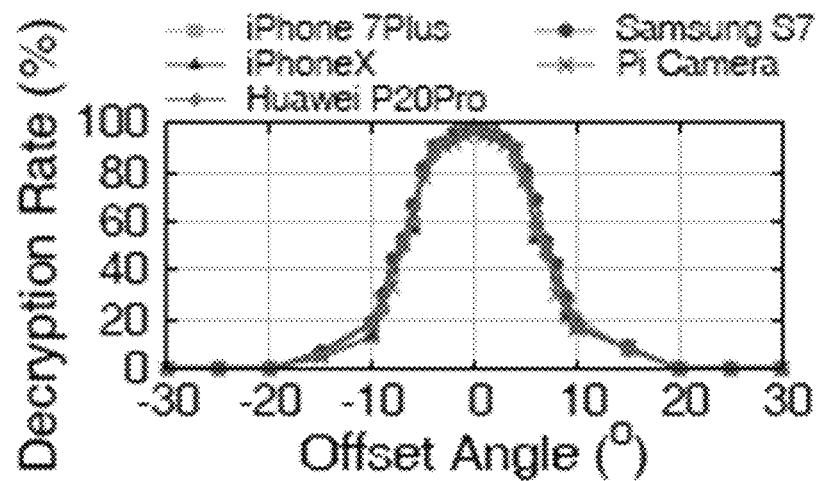

We will use the Samsung S7 mobile phone to display the encrypted QR code, and then use the iPhone6 and HuaweiPLE to shoot and decrypt at the 30 cm and 0° position from the Samsung S7 mobile phone. As shown in FIG. 7, we found that when the distance is 30 cm, the decoding rate reaches 100%. When the distance deviation reaches 5 cm, the decoding rate drops to 0% instantaneously. Similarly, when the angle is 0°, the decoding rate is as high as 100%. When the angular deviation reaches 5°, the decoding rate instantaneously drops to 0%.

The present application provides a QrCode communication encryption method based on nonlinear spatial frequency characteristics, which uses a moiré generated by an optical nonlinear spatial frequency to encrypt a target QrCode and is specified by a camera in a smartphone. The position and angle of the encrypted QR code are captured and decrypted to achieve secure communication of the two-dimensional code. Since the electronic screen displaying the QrCode itself has spatial frequency characteristics, the present application eliminates the need for special optical hardware and provides frequency modulation for a plurality of shooting distances. The present application systematically analyzes the spatial frequency characteristics of the screen and the camera, and realizes the encrypted communication of the QrCode on the common electronic display and the smart phone on the market.

What is claimed is:

1. A secure quick-response code (QrCode) communication method based on nonlinear spatial frequency, comprising:

camera modeling: modeling based on the spatial frequency of the color filter array of the scanning device's camera;

QrCode encryption: using the color filter array (CFA) spatial frequency of the scanning device's camera and its modeling result, and the spatial frequency of the display device, to generate an encrypted picture of the QrCode on the display device;

QrCode decryption: the camera of the scanning device captures the encrypted QrCode shown on the display at a specified position and a specified angle, analyzes the target QrCode and recovers the QrCode, wherein the modeling process specifically models the color filter array of the green filter layer, wherein the modeling result is:

$$m_{cfa}(x,y)=p_{cfa}(\phi_{cfa}(x,y))$$

$$p_{cfa}(u)=0.5+0.5\cos(2\pi u)$$

$$\phi_{cfa}(x,y)=((x,y)\bmod 2)/2$$

where, $m_{cfa}(x,y)$ is the green receiving information of the green filter layer on the camera image sensor at coordinates (x,y), $p_{cfa}(\cdot)$ is the periodic function of the green filter layer in the CFA, and $\phi_{cfa}(x,y)$ is the phase function of the green filter layer, and wherein the QrCode decryption process specifically comprises:

Step B1: acquiring a plurality of consecutive pictures captured by the camera in the specified position and the specified angle to encrypt the QrCode in the display;

Step B2: selecting an unprocessed image and converting the RGB image to the HSV coordinates to maximize the saturation dimension;

Step B3: according to the positions of the three positioning marks, determining the size of the QrCode and dividing the QrCode for the converted picture to obtain a plurality of blocks;

Step B4: extracting a green square, for each pixel point, when the green intensity is greater than a predetermined threshold, it is judged to be white, and vice versa, it is judged to be black;

Step B5: for each square, determine the color of the square according to the distribution of white and black pixel points in the square;

Step B6: traversing all the black squares and mark all adjacent black squares to the same index value;

Step B7: determining whether all the blocks are marked or unmarked squares are all surrounded by the marked blocks, if yes, proceed to step B8, otherwise, return to step B2; and Step B8: coloring according to the index value of each block, if two adjacent squares have the same index value, they are colored into the same color, and vice versa.

2. The method according to claim 1, the secure QrCode communication method based on the nonlinear spatial frequency is characterized wherein the QrCode encryption process specifically comprises:

Step A1: performing phase and frequency modulation on the original QrCode image picture by using the CFA spatial frequency of the scanning device's camera and the modeling result, and the spatial frequency of the display device;

Step A2: Add Gaussian white noise to the modulated picture to blur the contour in the encrypted QrCode.

3. The method according to claim 1, the secure QrCode communication method based on the nonlinear spatial frequency is characterized wherein the QrCode decryption process specifically comprises:

Step B1: acquiring a plurality of consecutive pictures captured by the camera in the specified position and the specified angle to encrypt the QrCode in the display;

Step B2: selecting an unprocessed image and converting the RGB image to the HSV coordinates to maximize the saturation dimension;

Step B3: according to the positions of the three positioning marks, determining the size of the QrCode and dividing the QrCode for the converted picture to obtain a plurality of blocks;

Step B4: extracting a green square, for each pixel point, when the green intensity is greater than a predetermined threshold, it is judged to be white, and vice versa, it is judged to be black;

Step B5: for each square, determine the color of the square according to the distribution of white and black pixel points in the square;

Step B6: traversing all the black squares and mark all adjacent black squares to the same index value;

Step B7: determining whether all the blocks are marked or unmarked squares are all surrounded by the marked blocks, if yes, proceed to step B8, otherwise, return to step B2;

Step B8: coloring according to the index value of each block, if two adjacent squares have the same index value, they are colored into the same color, and vice versa.

4. The method according to claim 3, the secure QrCode communication method based on the nonlinear spatial frequency is characterized, wherein the step B6 specifically comprises:

Step B61: traversing all the black squares, and determining an index value of each block under the frame based on the principle that all adjacent black squares mark the same index value;

Step B62: determining whether the index value exists in each block, and if not, the index value of the block in the current frame is used as the index value of the block, otherwise, step B63 is performed;

Step B63: determining whether the index value of the block in the current frame is consistent with the previous index value, if not, all the blocks marked with the index value of the block in the previous frame are marked with the index value of the block under the frame.

5. The method according to claim 3, the secure QrCode communication method based on the nonlinear spatial frequency is characteristized, wherein the step B8 specifically includes:

Step B81: coloring the squares in the three positioning mark areas;

Step B82, based on the coloring result of the squares in the three positioning areas, coloring according to the index values of the blocks, if the two adjacent squares have the same index value, the colors are colored the same color, and vice versa.

6. The method according to claim 1, the secure QrCode communication method based on nonlinear spatial frequency is characteristized, wherein the designated position is between 20 and 45 centimeters from the display.

7. The method according to claim 6, a secure QrCode communication method based on nonlinear spatial frequency is characteristized, wherein said designated position is 30 cm from the display.

8. The method according to claim 1, the secure two-dimensional code communication method based on nonlinear spatial frequency is characteristized, wherein the specified angle is perpendicular to an angle of the display plane.

* * * * *